United States Patent [19]

Perinetti

[11] Patent Number: 4,620,060
[45] Date of Patent: Oct. 28, 1986

[54] ADJUSTABLE VIBRATION DAMPER FOR STRETCHED SUSPENDED CABLES

[75] Inventor: Alberto Perinetti, Milan, Italy

[73] Assignee: A. Salvi & C. S.p.A., Milan, Italy

[21] Appl. No.: 714,918

[22] Filed: Mar. 22, 1985

[30] Foreign Application Priority Data

Mar. 22, 1984 [IT] Italy ................ 20184 A/84

[51] Int. Cl.$^4$ ............................. H02G 7/14
[52] U.S. Cl. ........................................ 174/42
[58] Field of Search ............................ 174/42

[56] References Cited

U.S. PATENT DOCUMENTS

| 1,992,538 | 2/1935 | Monroe et al. | 174/42 |
| 3,400,209 | 9/1968 | Minyu et al. | 174/42 |
| 3,432,610 | 3/1969 | Claren | 174/42 |
| 3,584,133 | 6/1971 | Claren | 174/42 |
| 4,159,393 | 6/1979 | Dulhunty | 174/42 |

FOREIGN PATENT DOCUMENTS 44-994 1/1969 Japan .................. 174/42

Primary Examiner—Laramie E. Askin
Attorney, Agent, or Firm—Stevens, Davis, Miller & Mosher

[57] ABSTRACT

The invention relates to a vibration damper for suspended cables, particularly for electric conductors of overhead high voltage lines, comprising a messenger cable fixed by its central part to a clamp of connection to the conductor, and two counterweights fixed to the messenger cable. Each of the counterweights is formed of a bar element, having a constant section throughout most of its length and being obtained by cutting to size a bar of indefinite length.

15 Claims, 8 Drawing Figures

ADJUSTABLE VIBRATION DAMPER FOR STRETCHED SUSPENDED CABLES

BACKGROUND OF THE INVENTION

1. Field of the Invention

Suspended cables, and particularly conductors for overhead electric lines, are known to vibrate due to the action of wind and such vibrations can lead to fatigue failure of said cables.

The frequency of said vibrations is substantially proportional to the wind speed.

For each type of electric cable or conductor, and for each value of the tensile stress to which said cable is subjected, it is possible to define the range of vibration frequencies which are dangerous for the integrity of said cable.

As known, the most adopted method for damping said vibrations is to use the so-called "vibration dampers", which are anchored in predetermined positions along the cable or conductor (see FIG. 1a).

2. Description of the Prior Art

The most widely used dampers are known as "Stockbridge" dampers, as described in the U.S. Pat. No. 1,992,538, granted on Feb. 26, 1935. They consist of a length of flexible steel cable, called "messenger cable", having the central part fixed to the conductor by means of a connection clamp, and of two counterweights fixed to either end of the messenger cable.

A damper constructed according to this known technique is shown in FIG. 1 of the accompanying drawings. It can be seen therein that the messenger cable 1 is a steel plait length and that the counterweights 4,4 have a bell shape. This shape allows to fix the counterweight at the end of the messenger cable, but at the same time it allows to position the barycenter (G) at a certain distance (a) from the end of said cable, and precisely in an intermediate position of the working length (l) of said cable.

The counterweights are normally obtained by iron casting or by casting of other alloys with specific high weight, or at times by pressed steel casting.

It has been possible to establish that dampers of this type have a marked damping effectiveness at their proper resonant frequencies, but far less effectiveness at different frequencies.

A suspended electric cable or conductor, provided with dampers of this type, may thus result well protected against the vibrations corresponding to said resonant frequencies, but insufficiently protected at the other frequencies.

A progress in this respect was obtained through the dampers according to the Italian Pat. No. 791,112 and No. 890,900 (or the corresponding U.S. Pat. No. 3,432,610 and No. 3,584,133) owned by the same Applicant, which have four resonant frequencies, instead of the only two frequencies found in the dampers of previous technique.

It is known that the damping characteristics and the resonant frequencies proper to a damper of the type heretofore described depend on different parameters, among which:

the counterweight mass,
the moment of inertia of the counterweight in respect of its barycenter,
the working length (l) of the cable,
the distance (a) of the barycenter (G) of the counterweight from the end of the working length of the messenger cable.

No absolute best values exist however for these parameters, which should instead actually be chosen in function of the vibrations to which a specific electric cable or conductor can be subjected, and of the required damping, particularly, in function of the range of dangerous frequencies and, for each frequency, of the damping effectiveness required to limit the vibration amplitudes to sufficiently low values so as not to produce a dangerous result.

Moreover, in the event that the damping of a given span of cable or conductor suspended between two extremes should require more than one damper, the above parameters should be chosen so as to distribute the resonant frequencies, proper to each of the dampers employed, in appropriate manner within the range of the dangerous frequencies.

The vibration conditions of the conductors are so varied and diversified that in order to apply, in each condition, dampers with optimized parameters, it would be necessary to employ a considerable number of counterweights of different shape and weight. Such an availability would, however, involve production costs (for the casting dies and relative depreciation) and storage costs which are so high as to be incompatible with present commercial requirements.

In practice, therefore, only about ten types of dampers are produced, or even less, and they are chosen almost only in function of the outer diameter of the cable or conductor.

Such a choice always forms a compromise, and it should in fact be noted that, very often, the dampers applied to the conductors have characteristics which differ from the optimal ones, whereby they provide the following drawbacks:

the first drawback is that, in order to obtain the desired global damping effect, it is necessary to use a larger number of dampers, with consequent higher costs;

a second possible drawback is that, in the event of using dampers having an excessive dynamic reaction, the conductor risks damage at the point of anchorage of the connection clamp.

SUMMARY OF THE INVENTION

The object of the present invention is to provide a damper designed to solve the aforementioned problem and whose structure is actually apt to satisfy the specific damping requirements of each electric cable or conductor, by allowing to gradually vary the resonant frequencies, independently one from the other, and generally the damping effectiveness of the various frequencies, while at the same time considerably reducing the production and storage problems.

This result is obtained due to the fact that the damper according to the invention, of the general type described hereabove with messenger cable and counterweights fixed at the ends thereof, comprises counterweights in the form of bar elements, having a constant section throughout most of their length. Preferably, said bar elements are obtained by cutting to size a bar of indefinite length, and they are fixed to the messenger cable by means of a connection element, apt to allow adjusting the counterweight in respect of the bar element and, respectively, said element with respect to the messenger cable, in any reciprocal position.

This construction allows to vary, gradually and independently one from the other, the four aforespecified parameters, namely the mass of each of the counterweights, its moment of inertia with respect to the barycenter, the working length of the messenger cable and the distance of the counterweight barycenter from the respective point of anchorage onto the messenger cable.

The possibility to modify the four mentioned parameters allows in turn to vary, gradually and independently one from the other, the proper resonant frequencies and, therefore, the damping effectiveness of the damper at the various frequencies.

BRIEF DESCRIPTION OF THE DRAWINGS

Further characteristics and advantages of the damper according to the invention will anyhow be evident from the following description of some preferred embodiments thereof, illustrated by way of example in the accompanying drawings, in which.

DESCRIPTION OF THE PREFERRED EMBODIMENTS

Figure 1:
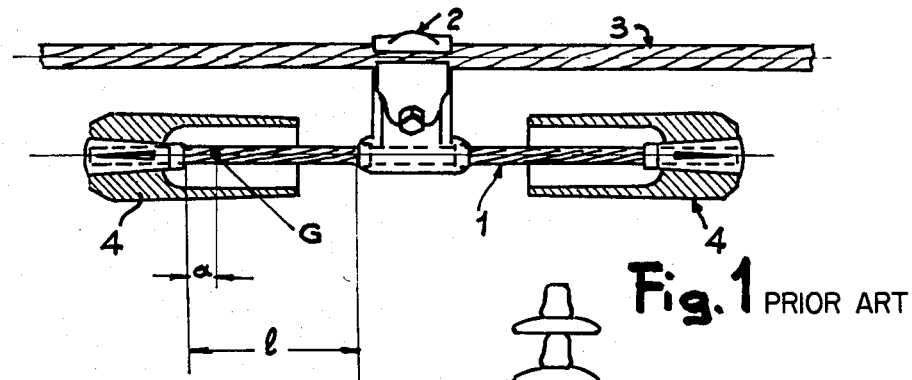
FIG. 1 shows a damper of known technique, with bell-shaped counterweights.
Figure 1A:
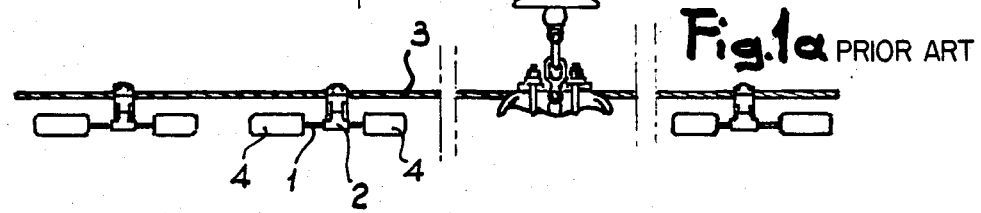
FIG. 1a shows the mounting arrangement of such dampers of known technique.

As clearly shown in FIG. 1, the dampers of known technique essentially comprise a messenger cable 1, having its central part fixed to a clamp 2 for connection to a cable or conductor 3, the vibrations of which have to be damped.

Hereinafter, reference is always made to a "conductor" subject to vibrations; however this term should not be intended in the restrictive sense, but should also include any other type of stretched suspended cable.

Bell-shaped counterweights 4 are fixed to the ends of the messenger cable 1. This bell shape is determined—according to a technique now dating back to many years and apt to provide the best damping characteristics—by the requirement to keep free and flexible a predetermined length (l)—so-called working length—of the messenger cable, while keeping the barycenter (G) of the counterweight shifted towards the centre by at least one distance (a), with respect to the end to which said counterweight is fixed.

This known damper suffers, however, from the limitations pointed out further above, for what concerns—on one hand—the scarce possibilities to modify the damping parameters in relation to planning requirements, and—on the other hand—the production costs for bell-shaped counterweights and their respective casting dies, and the costs for storing the dampers thus produced.

Figure 2:
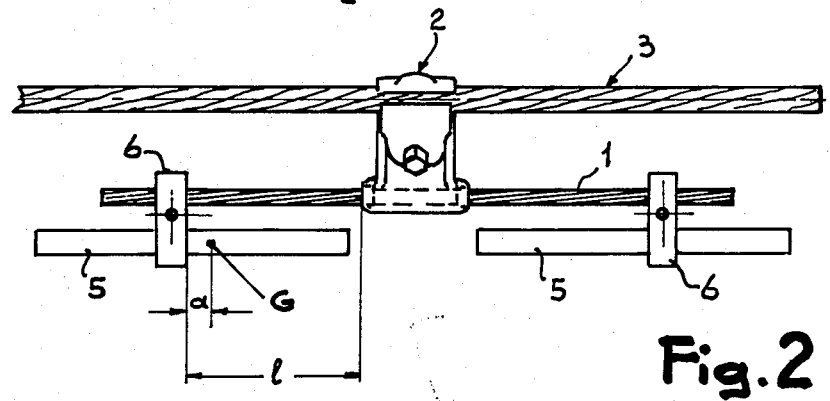
FIG. 2 is a side view of a damper according to the invention, fixed to a suspended conductor, in its simplest configuration.

Whereas, the damper according to the present invention—as shown for instance in FIG. 2—has a far simpler structure, which can be easily modified to satisfy the requirements of different projects.

In fact, said damper comprises the usual messenger cable 1 and clamp 2 for connection to the conductor 3, as well as counterweights 5 in the form of bar elements.

The bar elements 5 can be very simply produced by cutting to size a bar of indefinite length, for instance a round or polygonal section. Such bar elements are fixed to the messenger cable 1 by means of connection elements 6, by screw or pressure clamping, or by means of cast connection elements.

As can be easily understood, a structure of this type allows to realise—in an extremely simple and quick way—a damper having resonant frequencies and response characteristics which are optimal in relation to the expected use thereof. As already said, this is obtained by:

(a) determining the mass and moment of inertia of the barycenter of the counterweight, through choice of the section and cutting to size, according to a length predetermined at the planning stage, of one or various sections of predetermined shape. The easiness and quickness of cutting to size a bar from a section of indefinite length appears quite evident when compared to the production of a bell-shaped counterweight by die casting;

(b) determining the working length (l) of the messenger cable and the distance (a) of the barycenter (G) of the counterweight—on the basis of the planning data and when mounting the damper—by mere positioning of the connection element 6 in respect of the messenger cable 1 and simultaneous, but independent, positioning of the bar element 5 with respect to said element 6. Since the working length (l) of the messenger cable is fixed on assembly—as indicated above—this evidently also provides the advantage of normally producing the messenger cable of fixed length.

On account of the above, it can be said that the dampers are produced in two stages: a first stage, consisting in the production of a messenger cable 1 of fixed size and of a standard connection clamp 2, and in anchoring said clamp 2 to the centre of the cable 1; a second stage, consisting in the cutting to size of the bar elements 5 and fixing them onto the cable 1 in a predetermined position.

It is thus evident that the first is a stage of volume prefabrication, involving the storage of standard pieces, while the second is rather a stage of final assembly, which is carried out on the basis of the optimized parameters supplied by the specific design of conductor to be subjected to damping.

FIG. 2 shows an embodiment which, as said, is extremely simplified. In this case, the barycenter of the counterweight, or bar 5, does not lie on the axis of the messenger cable. Such an embodiment is acceptable when the conductor 3 is horizontal, namely when the vibrations—which are always perpendicular to the cable as well as to the wind direction—are merely vertical.

Figure 3:
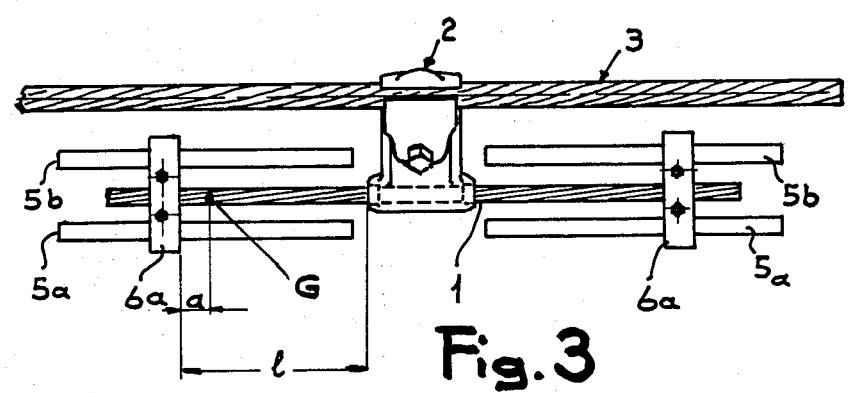
FIGS. 3 and 4 show two modified embodiments of the damper according to the invention, having more complex and better balanced configurations.

Whereas, when the conductor is positioned vertically, or oblique, it is preferable to adopt an embodiment like that shown in FIG. 3. In this case, each counterweight is formed of a pair of bar elements 5a, 5b, fixed by a single connection element 6a, so that the barycenter (G) of the two-bar assembly actually lies on the axis of the messenger cable. A damper thus realised is apt to dampen vibrations occurring in every direction.

It should be pointed out that the plane containing the two bar elements 5a and 5b is not necessarily a vertical plane, as shown in FIG. 3, but it can be any plane, as long as passing through the axis of the messenger cable 1.

Figure 4:
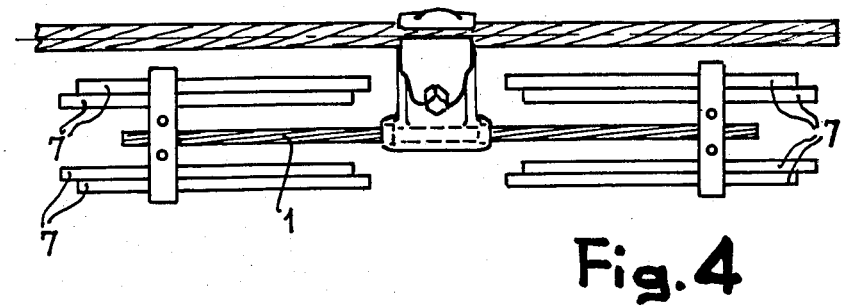

FIG. 4 shows a further embodiment, wherein each of the bar elements of FIGS. 2 and 3 is replaced by two or more bar elements 7, each group of two or more bar elements 7 having a total section equal to the section of the single bar element 5 thus replaced.

The advantage of this embodiment lies in the fact that, when mounting the counterweights, it is possible to vary the mutual position of the single bar elements 7, so as to vary the moment of inertia, without however altering the mass and without replacing the elements of the group.

With this embodiment, few types of differently shaped sections can be used to obtain the bar elements 7. In fact, several bar elements 7, also of different lengths, can be suitably arranged and mutually connected in order to obtain the desired final characteristics concerning the mass and moment of inertia of the counterweights. Alternatively, it is also possible to use a single type of bar section, of definite shape, by differently arranging the bar elements 7.

Figure 5:
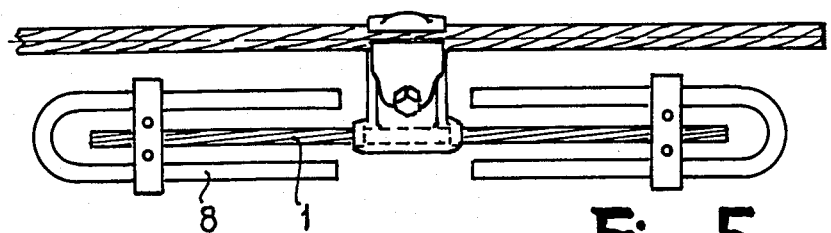
FIGS. 5 to 7 show three further embodiments of the damper according to the invention, particularly suited to prevent glow discharges through corona effect.
Figure 6:
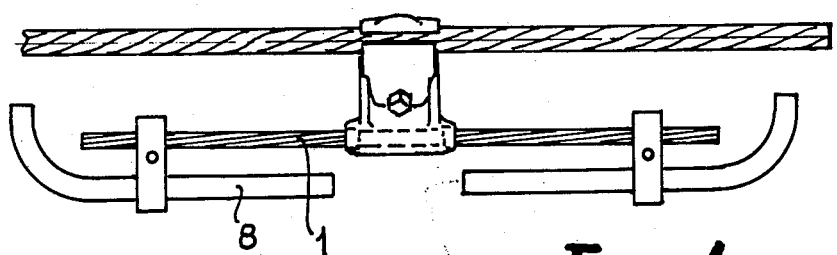
Figure 7:
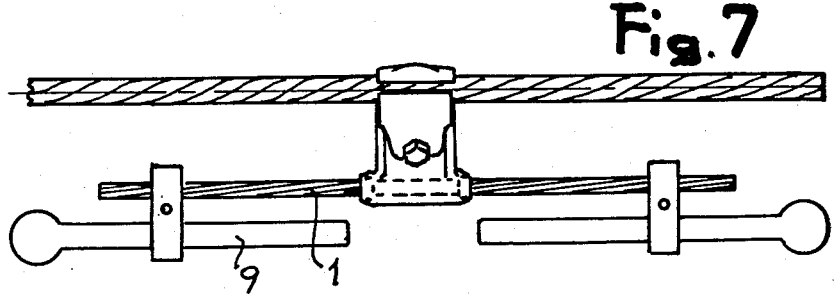

FIGS. 5, 6 and 7 show still further embodiments, particularly suited for use on conductors of high voltage electric lines. For this application, dampers are in fact required to prevent phenomena of glow discharges through corona effect. As can be easily understood, these modified embodiments actually tend to reduce these phenomena, thanks to the bent or round-shaped configuration of the ends of the bar elements 8, 9, forming the counterweights.

The rounding-off of the ends of the bar elements 8, shown in FIGS. 5 and 6, can easily be obtained by bending or curving the bars, before or after their cutting to size; whereas, the round-shaped end of the bar element 9 of FIG. 7 can eventually be obtained by upsetting.

It should finally be noted that the dampers of the different embodiments shown in the accompanying drawings have a symmetrical arrangement of the counterweights, but this should not be interpreted in the restrictive sense. In fact, all the embodiments described can equally well be realised in a nonsymmetrical configuration, according to the teaching provided in the heretofore mentioned U.S. Pat. No. 3,432,610 and No. 3,584,133.

The important advantages of the damper according to the present invention—for what concerns the possibility of obtaining optimized parameters in relation to the planning data, and for what concerns its low production costs—allow furthermore:

to easily modify the parameters of the initial project, according to the conditions of use which will actually be met in practice later on;

to easily carry out productions of small quantities, for pilot systems or even only for tests; all this being obtained at perfectly acceptable costs, which would be quite unthinkable with the dampers of known technique.

It is anyhow understood that the invention is not limited to the particular embodiments described and illustrated, which have been given by mere way of example, but that many other embodiments can easily be realised by a technician skilled in the art, without thereby departing from the protection scope of the invention itself.

I claim:

1. Vibration damper for stretched suspended cables or conductors, comprising a messenger cable, two counterweights, a connection element adjustably connecting each counterweight to said messenger cable and said messenger cable to said counterweight and a connection clamp connected to said messenger cable between said counterweights, each said counterweight being formed of at least one bar element of constant section.

2. The vibration damper as in claim 1 wherein the messenger cable is of fixed length.

3. The vibration damper as in claim 2 wherein said bar elements have the same section.

4. The vibration damper as in claim 3 wherein said counterweights have different masses, said masses being obtained by combining different bar elements.

5. The vibration damper as in claim 3 wherein said counterweights have different moments of inertia, said moments of inertia being obtained by combining different bar elements.

6. The vibration damper as in claim 3 wherein said counterweights have different masses and different moments of inertia, said different masses and different moments of inertia being obtained by combining different bar elements.

7. The vibration damper as in claim 2 wherein said bar elements have different sections.

8. Vibration damper as in claim 2 wherein the reciprocal position of the single bar elements forming a counterweight is varyingly adjustable.

9. The vibration damper as in claim 2 wherein said bar elements have the same length.

10. The vibration damper as in claim 2 wherein said bar elements have the same section and length.

11. The vibration damper as in claim 2 wherein said bar elements have different lengths.

12. The vibration damper as in claim 2 wherein said bar elements have different sections and lengths.

13. The vibration damper as in claim 1 wherein each counterweight is formed of several side by side bar elements.

14. The vibration damper as in claim 1, wherein each bar element forming a counterweight has its outer end bent inwardly.

15. The vibration damper as in claim 1 wherein each bar element forming a counterweight has its outer end round shaped.

* * * * *